United States Patent [19]

Saxe

[11] 4,164,365

[45] Aug. 14, 1979

[54] LIGHT VALVE FOR CONTROLLING THE TRANSMISSION OF RADIATION COMPRISING A CELL AND A STABILIZED LIQUID SUSPENSION

[75] Inventor: Robert L. Saxe, New York, N.Y.

[73] Assignee: Research Frontiers Incorporated, Plainview, N.Y.

[21] Appl. No.: 932,512

[22] Filed: Aug. 10, 1978

Related U.S. Application Data

[60] Division of Ser. No. 596,198, Jul. 15, 1975, abandoned, which is a continuation-in-part of Ser. No. 476,106, Jun. 3, 1974, abandoned, which is a continuation-in-part of Ser. No. 276,769, Jul. 31, 1972, abandoned.

[51] Int. Cl.$^2$ .................................................. G02F 1/00
[52] U.S. Cl. ............................ 350/362; 260/29.1 SB; 260/31.2 R; 260/33.2 R; 260/33.6 R; 260/33.8 R; 260/34.2
[58] Field of Search ................... 350/150, 151, 362

[56] References Cited

U.S. PATENT DOCUMENTS

| | | | |
|---|---|---|---|
| 1,955,923 | 4/1934 | Land | 350/151 |
| 3,317,635 | 5/1967 | Osmond et al. | 260/34.2 |
| 3,433,753 | 3/1969 | Farkas et al. | 260/34.2 |
| 3,454,518 | 7/1969 | Kelley | 260/31.4 |
| 3,505,268 | 4/1970 | Backhouse et al. | 260/31.2 |
| 3,532,662 | 10/1970 | Ansdell | 260/34.2 |
| 3,557,037 | 1/1971 | Collins et al. | 260/33.8 R |
| 3,580,880 | 5/1971 | Clarke et al. | 260/34.2 |
| 3,708,219 | 1/1973 | Forlini et al. | 350/362 |
| 3,723,151 | 3/1973 | Backhouse et al. | 260/34.2 |
| 3,743,382 | 7/1973 | Rosenberg | 350/362 |
| 3,788,996 | 1/1974 | Thompson | 260/34.2 |
| 4,025,163 | 5/1977 | Saxe et al. | 350/362 |

*Primary Examiner*—Allan Lieberman
*Attorney, Agent, or Firm*—Jacobs & Jacobs

[57] ABSTRACT

Polymeric materials which are used to stabilize particles including colloidal size particles, particularly particles which polarize light or other radiation and include halogen in their composition. The materials are long chain molecular copolymers having available functional groups such as OH or acidic groups in their structure and are soluble in liquids in which the colloidal particles are suspendable. At least one monomer of those used to form the copolymer has a branched structure, which may include more than one branch. Some of the materials are copolymers of 3,5,5-trimethylhexyl acrylate/2-hydroxypropyl acrylate/fumaric acid; 5,5-diethyl hexyl acrylate/2-hydrooxypropyl acrylate/fumaric acid; and bis-2-ethylhexyl fumarate/3,5,5-trimethyl hexyl acrylate/vinylidene chloride/mesaconic acid. The materials retard or prevent the suspended particles in light valve suspensions from grouping together when a voltage is placed across the suspension containing these particles. The materials also reduce the voltage and electrical power needed to achieve a given change in light transmission for a light valve. They also enable suspensions to be used at elevated temperatures without significant degradation.

25 Claims, No Drawings

LIGHT VALVE FOR CONTROLLING THE TRANSMISSION OF RADIATION COMPRISING A CELL AND A STABILIZED LIQUID SUSPENSION

CROSS REFERENCE

This application is a division of Ser. No., 596,198 filed July 15, 1975 and now abandoned, which is a continuation-in-part of Ser. No. 476,106 filed June 3, 1974 and now abandoned, which is a continuation-in-part of Ser. No. 276,769 filed July 31, 1972 and now abandoned.

BACKGROUND OF THE INVENTION

This invention relates to polymeric materials which stabilize particles including particles of colloidal size to prevent them from grouping together, i.e., agglomerating, when the particles are in suspension. In colloidal systems and especially liquid colloidal suspensions, the particles in suspension tend to group or stick together to form large groups of particles. This phenomenon is often referred to as agglomeration. The formation of large groups of particles destroys the substantially homogeneous distribution of the particles in suspension and essentially renders the suspension useless. This problem is particularly acute in suspensions which are used in light valves. In the operation of the light valve, a voltage is applied across the suspension. This voltage, because of the relative charges on or associated with the particles, can cause the particles to group together and form large groups of agglomerates. These masses prevent the proper functioning of the light valve and thereby destroy its utility.

There has been a need, therefore, to develop a material which would effectively act to prevent the suspended colloidal particles in a light valve from agglomerating.

Although the prior art is replete with patents pertaining to dispersants including polymeric materials for maintaining particles in suspension, these materials are either unsuitable for use in a light valve suspension or greatly inferior for such purpose to the polymers of the present invention. Descriptions of light valves that use a liquid suspension are given in U.S. Pat. No. 1,955,923 (Land), and in U.S. Pat. No. 3,708,219 (Forlini et al.). Basically they are devices which control the transmission of light.

In order to be suitable for use in a light valve suspension, a polymer should be soluble in the liquid suspending medium of the suspension. The polymer should furthermore be capable of associating with the surfaces of the suspended particles in order effectively to furnish steric protection from agglomeration particulary when particles are aligned under influence of an electric field, (a condition which drastically increases the tendency to agglomerate). Also the polymer should associate with the particles so that if the polymer is present when the particles are initially formed it will prevent the particles from growing too large and help to minimize formation of aggregates of particles during formation. The polymer should not attack the suspended particles so as to cause them to degrade and should not itself degrade at the temperature of use or at temperatures at which the suspension may be stored, lest its degradation products attack the suspended particles. Degradation causes a loss of the polymer's ability to impart steric protection and other benefits herein described. The polymer should preferably have a wide range of solubility so that, if desired, it can be dissolved in the polar liquids in which many of the particles used in light valves are initially formed, and also be soluble in relatively nonpolar and low conductivity liquids used in operating light valves. The polymer should not coat the walls or the electrodes on the walls of the light valve, because a polymer that sticks to them creates a hazy appearance that destroys the clear view through the light valve and reduces the maximum light transmission or change of transmission attainable from the light valve. Further the polymer should improve the voltage characteristics of the suspension in that it should enable one to obtain a greater change in light transmission for a given voltage gradient applied across the suspension, than is possible if one employed nitrocellulose, the prior art polymer used in light valve suspensions by others. In this connection it is especially important and preferable to be able to do so at low frequencies e.g. 1000 Hertz or less, because electrical power usage is very much lower at low frequency than at higher activating frequencies.

Nitrocellulose, as previously mentioned, has been in use for a considerable length of time and does work to a certain extent in light valve suspensions. Although it does somewhat prevent agglomeration, nitrocellulose has the significant disadvantage of being highly subject to degradation at only moderately high temperatures. For example, nitrocellulose will degrade at or below 150° F. At such temperatures nitrocellulose can break down and form nitrous and nitric acid and other degradation products and these can attack the particles in suspension. If the particles degrade when attacked by such acid or other degradation products the suspension will be destroyed. Nitrocellulose also has a further major disadvantage in that there are a limited number of suspending media in which it can be dissolved when it is used in light valves. These media are essentially limited to organic esters. For many functions esters are not the most desirable liquids in which to suspend the particles. Therefore, nitrocellulose has very serious chemical and physical drawbacks which are overcome by the polymeric materials of this invention. These polymers have much greater thermal stability than nitrocellulose and will not generally break down unless temperatures are reached that are far above the point at which nitrocellulose will form nitrous and nitric acid. In addition, they are soluble in many relatively nonconductive liquid suspending media in addition to esters.

SUMMARY OF THE INVENTION

It is an object of this invention to provide a novel and improved polymer to stabilize liquid suspensions.

It is another object of this invention to provide such a polymer for use in liquid suspensions for light valves.

It is another object of this invention to provide such a polymer which prevents or retards agglomeration of the particles in suspension.

It is another object of this invention to provide such a polymer which reduces the voltage and electrical power needed to achieve a given change in light transmission for a light valve.

It is another object of this invention to provide such a polymer which is a long chain molecular copolymer having available functional groups such as OH or acidic groups in its structure.

It is another object of this invention to provide such a polymer wherein at least one of its monomers has a branched structure.

It is another object of this invention to provide such a polymer which imparts thermal stability to a liquid suspension.

It is another object of this invention to provide such a polymer having a wide range of solubility in both polar and non-polar liquids.

It is still another object of this invention to provide such a polymer that will not coat the walls or electrodes of a light valve.

It is still another object of this invention to provide a light valve suspension including such a polymer.

It is still another object of this invention to provide a stabilized light valve suspension by adding such a polymer.

In carrying out the objects of this invention a polymeric material is provided which stabilizes suspensions including colloidal particles and especially halogen-containing light polarizing particles e.g., herapathite, purpureocobaltchloridesulfateperiodide, and cupric bromide.

The materials are long chain molecular copolymers having available functional groups such as OH or acidic groups in their structure and are soluble in liquids in which the colloidal particles are suspendable. At least one monomer of those used to form the copolymer has a branched structure, which may include more than one branch. Some of the materials are copolymers of 3,5,5-trimethylhexyl acrylate/2-hydroxypropyl acrylate/fumaric acid; 5,5-diethyl hexyl acrylate/2-hydroxypropyl acrylate/fumaric acid; and bis-2-ethylhexyl fumarate/3,5,5-trimethyl hexyl acrylate/vinylidene chloride/mesaconic acid. The polymers act to prevent or retard agglomeration of the particles in suspension especially when the suspension is in use in a light valve and a voltage is placed across the suspension. The polymers also make it possible for suspensions to be used at elevated temperatures without significant degradation, and reduce the voltage gradient and electrical power needed to achieve a given change in light transmission for the light valve.

PREFERRED EMBODIMENT OF THE INVENTION

This invention relates to polymeric materials which stabilize colloidal particles and particularly to polymeric materials which associate with these particles to maintain the stability of the particles and prevent them from agglomerating to form large groups of particles. A principal purpose of the invention and polymeric materials is to maintain a substantially homogeneous distribution of these colloidal particles in a suspending medium. In liquid suspensions it is most important that the suspended particles be substantially uniformly distributed throughout the suspension. This uniform distribution is especially important when the liquid suspensions are used in light valves. The materials of this invention comprise copolymers, and in particular copolymers which include at least one type of monomer having an available OH group or acidic group which is sterically unhindered and in a position to associate or bond with an element or part of the particles being stabilized. The remaining part of the copolymer is preferably a monomer which is soluble in the liquid medium in which the particles are suspended. The polymeric stabilizing material thus has to be a material which both strongly bonds the copolymer to the particles and also must be soluble in the suspending medium. If neither part of the copolymer were soluble in the suspending medium, the polymer chains associated with particles would not be in a state or condition to extend a substantial distance outward from the particles to prevent agglomeration effectively. The materials of this invention are particularly suited for the suspensions which are used in light valves.

Briefly, a light valve consists of two sheets of usually transparent material such as glass or plastic which are spaced apart a very small distance such as 1 to 50 mils and are connected around their periphery by an adhesive or other suitable sealing material. The sheets have transparent electrically conductive coatings of a material such as tin oxide or indium oxide on their inner facing surfaces and the coatings are connected via leads such as conductive silver paint and wiring to a source of power, preferably a source of AC voltage. The space between the transparent sheets is filled with a suspension such as a suspension of herapathite particles in a suspending medium such as amyl acetate or isopentyl acetate.

The herapathite (or other) particles used in a light valve are small, preferably colloidal sized and are anisometrically shaped, preferably lath-like, rod-shaped or needle-shaped particles having an aspect ratio preferably ranging from 5 to 1 to 20 to 1. These anisometric particles, which are preferably light polarizing, polyhalide particles, are normally unaligned, that is randomly oriented (i.e., totally disoriented) in the suspension. Provided that there is a sufficiently high concentration of unaligned crystals in suspension, light cannot easily pass through the suspension because it is absorbed or blocked by the plurality of particles. The suspension will appear very dark. However, when an electric field is applied across the suspension, the particles align parallel to the field (perpendicular to the transparent light valve walls). This is accomplished by placing a voltage across the leads that are connected to the thin transparent conductive coatings which are applied on the inside faces of the walls of the cell. The voltage is thus placed across the transparent walls or sheets so the field passes through the suspension. When a voltage exists through the suspension, the herapathite or other suitable polarizing particles become aligned as aforesaid so that their long axes are perpendicular to the transparent coatings i.e., parallel to the electric field between the coatings. In this position the particles will block very little of the light passing through the suspension since the particles will generally have their long axes parallel to the direction of the light passing through. Thus, when an electric field is placed across the cell, or in other words, when the cell is placed in the "on" condition, light can readily pass therethrough. The suspending medium in which the particles are suspended is preferably transparent so that once the particles are aligned there is little to block the transmission of visible light or other radiation through the suspension. However, once the voltage is removed, Brownian movement quickly disaligns the particles so that their longer axes will be at angles to the direction of the light in many cases and therefore, light will not be able to readily pass through the suspension.

A major problem as aforementioned with these and other colloidal particles is that they tend to be attracted to each other. This is especially true when a voltage is placed across the suspension. Under the influence of an electric field the particles are thought to act like induced dipoles and the attraction between the positive and negative ends of proximate particles is sufficient so that once the voltage is placed across the suspension, they will start grouping rapidly together to form large groups of particles. This will defeat the purpose of the light valve since in the "on" condition it should preferably remain uniformly transparent. However, there will be relatively large black areas where the particles have grouped together and where the suspension is no longer transparent. What is needed therefor is a material which will prevent the particles from grouping together or will essentially keep them in their normal properly dispersed suspended relationship. The new materials of this invention achieve this result. These materials readily associate with and stabilize the herapathite or other halogen-containing light polarizing particles. The particles being stabilized are preferably ones that contain iodine, such as herapathite - or ones that contain other halogen elements in their structure, such as cupric bromide. The polymeric stabilizing materials not only associate with the polarizing particles but also contain components in their structure which permit them to readily dissolve in the liquids in which polarizing particles are suspended. Some of the polymeric materials that are used include copolymers of 2-ethylhexyl acrylate/acrylic acid; 2-ethylhexyl acrylate/hydroxyethyl methacrylate; 2-ethylhexyl acrylate/2-hydroxypropyl acrylate/acrylic acid; 2-ethylhexylacrylate/2-hydroxypropyl acrylate/fumaric acid; 2-ethylhexyl acrylate/2-hydroxypropyl acrylate/vinylidene chloride/fumaric acid; 3,5,5-trimethyl hexyl acrylate/2-hydroxypropyl methacrylate; 3,5,5-trimethyl hexyl acrylate/2-hydroxypropyl acrylate/fumaric acid; bis-2-ethylhexyl fumarate/2-hydroxypropyl acrylate/acrylonitrile; 5,5-diethyl hexyl acrylate/2-hydroxypropyl acrylate/fumaric acid; and bis-2-ethylhexyl fumarate/3,5,5-trimethyl hexyl acrylate/vinylidene chloride/mesaconic acid. All of these materials have a functional group of a polar character such as an OH and/or an acidic group in a position to readily associate with and form a bond with the particle, probably with the halogen, such as iodine in the structure or herapathite particles being stabilized but possibly also or alternatively with another part of the particle. The association or bond formed by this OH or acidic group is thought to be a hydrogen bond but may possibly be another type of bond or be in addition to another type of bond such as a coordinate covalent bond. However, it appears that the OH or acidic group and not the hydrogen alone is needed for the bonding. It is also thought that the hydrogen bonding and/or coordinate covalency through the oxygen leads to the effectiveness of the bond. These bonds between polymer and particles are extremely strong bonds. It is noted that in the case of certain substances, acrylic acid, for example, there is a COOH group available. It is thought that the OH is probably the primary reason for its effective action. However, the CO may also be active. It will be appreciated that in all the cases some available i.e., free OH or acidic group is present in a copolymer. By "free" it is meant that the OH or acidic group is in a position that makes it available for bonding, that is, it is sterically unhindered by the remaining structure of the molecule of which it is a part, so that it can readily act to form the hydrogen bond and/or coordinate covalent bond with halogen, or for particles that do not contain halogen in their molecular structure with the attracted atom or group. If the OH or acidic group were not in this position, for example if in a copolymer it was constricted by rigid groups in close proximity to it, it would not be in as good a position to readily combine and therefore the material involved would not be one that would be an effective bonding or stabilizing agent. It will be appreciated then that in the copolymer materials listed above, the acid or acidic monomers or monomers which include functional groups e.g., acrylic acid, fumaric acid, mesaconic acid, maleic acid or acrylonitrile, or one of the hydroxyalkyl ester monomers e.g., hydroxyethyl acrylate, hydroxyethyl methacrylate, or 2-hydroxypropyl acrylate are the substances which include available acidic or OH groups and act to combine with the halogen element or other part of the particle to form the association or bond. These monomers, depending upon choice of monomer may or may not be branched, and may or may not be soluble in the suspending medium depending upon choice of monomer and medium. Another part of these copolymers, that is, for example, 2-ethylhexyl acrylate, bis-2-ethylhexyl fumarate, 5,5-diethylhexyl acrylate or 3,5,5-trimethyl hexyl acrylate, acts to dissolve the copolymers in the suspending liquid medium.

It is preferably a branched monomer, and more preferably has two or more branches. Branching greatly enhances the ability of the copolymer to retard agglomeration of a light valve suspension under the influence of an electric field and is necessary to be effective against agglomeration. Although even one branch, such as the ethyl group of the monomer 2-ethylhexyl acrylate is helpful in this regard and considerably more effective than an unbranched monomer such as octyl acrylate, it is much more useful to have a plurality of branches. Although the precise reason why branching impedes agglomeration is not known, one possible theroretical reason may be that, provided the branches do not block bonding groups from bonding to the particles to be stabilized, the space occupied by the branch may convey steric protection by preventing two particles from approaching one another too closely. If this theory is correct it would be reasonable to expect that a plurality of branches will be more effective than one branch of about the same size, as one finds experimentally. For reasons that are as yet unknown the presence of a branched monomer in the copolymer also reduces the voltage gradient needed to achieve a given change in light transmission for a light valve, as hereinafter discussed.

Preferably at least one monomer, such as the aforesaid branched monomer, which serves, it is thought, a steric blocking function, should possess no functional bonding groups. Preferably also such monomer or monomers should constitute a majority of the copolymer by weight percent and should be the largest monomer or monomers therein in terms of the comparative molecular weights of the monomers. The branches may themselves be branched i.e. have sub-branches attached thereto.

Although the branched monomers and many of the other monomers given in the preceding examples are esters, they may be of numerous other types. For example, the copolymers may include monomers such as ethers or cyclic monomers, and may include monomers having particularly useful substituent groups such as halogenated monomers, in particular fluorinated monomers which aid the copolymer in the attainment of solubility in fluorinated liquids which may be useful suspending media.

If desired, two or more copolymers of similar or differing characteristics may be used in a suspension simultaneously.

The suspending medium, which for light valves is preferably electrically nonconductive, can be such diverse fluids as aliphatic or aromatic hydrocarbons, silicones, esters and non-polar ethers, and particularly halogenated chemically stable solvents such as fluorinated alkanes, fluorinated esters and fluorinated ethers and mixtures thereof.

When using a fluorinated liquid in a suspending medium it may be necessary to include with it a more polar but relatively nonconductive liquid such as an ester e.g., isopentyl acetate as part of the suspending medium of a suspension in order to get alignment of the particles at moderate voltages. Moreover, the weight percent or mole percent of each type of monomer or the weight percent of OH or acidic groups used in a copolymer can be tailored and adjusted to make possible solubility in a particular liquid or liquids. Thus, the copolymers combine the effective bonding action with the ability to dissolve in many types of liquid suspending media. The part of these polymeric materials that dissolves in the suspending medium should be sufficiently soluble that the copolymer as a whole can substantially dissolve in the suspending medium. It will be appreciated that in the operation of light valves the more nonconductive the suspending medium is, the better the light valve will function and perform. That is, the less conductive the liquid medium, the less electric power and voltage are usually required to cause the alignment of the particles, and hence the more readily operable the light valve will be. Thus, it is one of the advantages of the present copolymers that they will readily dissolve in very nonconductive suspending media. Some of these relatively nonconductive suspending media have been mentioned previously but it will be noted that there are many of them and it could be said that suspending media having an electrical resistivity of approximately $5 \times 10^7$ ohm-cm or more, and preferably $5 \times 10^9$ ohm-cm or more, will be operable with the present materials. A suspension (which includes the suspended particles and copolymer) will be somewhat less resistive than the suspending medium alone.

The polymeric materials of the invention have particularly good thermal characteristics, that is, the copolymers can generally withstand a temperature ranging from as low as the freezing point of suspending medium to temperatures in excess of 100° C. without breaking down. This permits the light valves to operate over a wide range of temperatures and particularly with nonconductive suspending media.

Nitrocellulose, which was used in prior art light valve suspensions, has very poor thermal properties as aforesaid. At temperatures at or below about 150° F. nitrocellulose soon begins to break down and form nitrous acid, nitric acid and other degradation products. Formation of such degradation products reduces the amount of nitrocellulose available to retard agglomeration, and degradation products also attack and can substantially ruin a suspension. The new materials described herein, however, overcome these disadvantages.

Nitrocellulose, further, has the disadvantage that it can only be dissolved in certain liquid suspending media. Obviously, the medium must be one that nitrocellulose will dissolve in. These are essentially organic esters such as isopentyl acetate and amyl or ethyl acetate. The non-viscous types of esters, which have a viscosity at 25° C. of 5 centipoises or less, are not particularly nonconductive. They generally have a resistivity of $2 \times 10^8$ ohm-cm, or less. Such non-viscous media are desirable when rapid alignment and disalignment of particles is sought. However, with the present copolymers, resistivities one or more orders of magnitude greater can be readily achieved because suspending media can be used with these copolymers that have higher resistivities i.e., lower conductivity at the same viscosity, and thus lower conductivity suspensions can be achieved at the same viscosity.

These copolymeric materials can be used initially during the formation of the particles so that the particles do not agglomerate and group together during their formation and can be left bonded to the particles so that the material continues to prevent agglomeration during all stages of the particles' life and their use or operation. However, they also can be used subsequent to particle formation when they are about to be used in a suspension. A polymer may also be added to a suspension which already includes some of the same polymer or of a different polymer.

Some examples of polyhalide materials that will form the suspended particles and are capable of polarizing light and useable in light valves include the aforementioned herapathite, purpureocobaltchloridesulfateperiodide, and cupric bromide.

The following are examples of the production of suspensions for light valves and other particles using herapathite and using various copolymers. In examples 1 to 9 and example 12 the copolymer is used during the formation of particles used in the suspension and is retained in association with the particles when the suspension is made and actually put in operation. In examples 10 and 11 the copolymer is added to the particles after the particles are formed, and the polymer-bonded particles then placed in suspension and then operated in a light valve.

The copolymers used are preferably ones having an extended chain length of approximately 600 to 4,200 angstroms or more. Although they may be of random structural composition, alternating, block, or graft copolymers may also be used advantageously. The following are examples of the present invention.

EXAMPLE 1

42.5 grams of a 33⅓% solution of the copolymer 2-ethylhexyl acrylate/acrylic acid, 75%/25% by weight, in 2-ethoxyethanol is combined with 3.75 grams of quinine bisulphate and 0.50 grams of fluoroalcohol. Then, 8.5 grams of methanol and 10 grams of additional 2-ethoxyethanol are added. An alcoholic solution of a plasticizer (optional), iodine and hydriodic acid (HI) is reacted with the above ingredients by mixing to form a wet paste of herapathite. The paste is then dried to remove the volatile solvents.

At this point a liquid suspending medium is added to the paste which is dispersed therein by continuous mixing and grinding.

In this test the content of acid-including monomer in the copolymer as noted above was only 25% by weight in order to enhance the chance for the copolymer to dissolve in the suspending medium of a light valve in order to effect dispersion of the dried paste. Favorable results occured. The optical density of the resulting suspension is isopentyl acetate in a light valve was observed to change from 3.0 to approximately 0.85 when activated, indicating a substantial opening.

EXAMPLE 2

Example 1 was repeated except that the ingredients were as follows: 42.5 grams of a 30% by weight solution of 2-ethylhexyl acrylate/acrylic acid in 2-ethoxyethanol as in Example No. 1, 2.68 grams of quinine bisulphate, 7.30 grams of methanol and 10 additional grams of 2-ethoxyethanol.

EXAMPLE 3

Example 2 was repeated except that the 10 additional grams of 2-ethoxyethanol were omitted and 0.50 grams of chloroform added to the contents prior to reaction.

EXAMPLE 4

A copolymer of 2-ethylhexyl acrylate/acrylic acid, 50%/50% by weight was prepared. 42.5 grams of the solution of the copolymer was prepared as a 25% by weight solution in 2-ethoxyethanol to which was added 3.75 grams of quinine bisulphate and 8.50 grams of methanol. As in Example 1, an alcoholic solution of a plasticizer, iodine, and hydriodic acid was reacted with the above ingredients to form a wet paste. The dried paste, using heat to aid dispersion, was then suspended in decyl alcohol. The substance was placed in a light valve and satisfactory operation was achieved.

EXAMPLE 5

Example 1 was repeated except that an 85%/15% by weight copolymer of 2-ethylhexyl acrylate/acrylic acid was substituted for the 75%/25% copolymer. The dried paste, unlike the paste in Example 1, was dispersible in the aromatic hydrocarbons, toluene, and, as in Example 1, displayed substantial opening in a light valve. Toluene has the advantages of having a high electrical resistivity, and a low viscosity and therefore a fast response in a light valve.

EXAMPLE 6

Example 1 is repeated but n-propanol is substituted for 2-ethoxyethanol to enhance copolymer solubility, and a 93.5%/6.5% by weight copolymer of 2-ethylhexyl acrylate/acrylic acid substituted for the copolymer of Example 1. The resulting dried paste of herapathite was dispersible in an aliphatic hydrocarbon, hexane. Aliphatic hydrocarbons have low viscosities and are generally less conductive at low viscosities than esters. Aliphatic hydrocarbons are therefore desirable suspending media for certain light valves.

EXAMPLE 7

Approximately 0.2 grams of purpureocobaltchloridesulfateperiodide, an inorganic polyiodide, was mortared in 1 gram of a 75%/25% by weight copolymer of 2-ethylhexyl acrylate/acrylic acid as a 33⅓% solution in 2-ethoxyethanol. After drying to evaporate the 2-ethoxyethanol, the particles were suspended in isopentyl acetate and the resulting suspension in a light valve had a gray appearance. Using a voltage gradient of between 30 and 90 volts per mil, in a pulsed mode of operation, the suspension was observed to pulse open and closed continuously in response to the applied voltage without noticeable significant agglomeration. Under a continuous voltage gradient of approximately 30 volts per mil and greater a continuous opening of the suspension was observed for several seconds without significant agglomeration.

EXAMPLE 8

Approximately 0.04 grams of cupric bromide, a polyhalide material in which the halogen is bromine, was mortared in 1 gram of a 75%/25% by weight copolymer of 2-ethylhexyl acrylate/acrylic acid as a 33⅓% solution in 2-ethoxyethanol. After drying to evaporate the 2-ethoxyethanol, the resulting suspension was suspended in isopentyl acetate in a light valve and had a greenish-yellow appearance. Repeated pulsing was observed at a voltage gradient of 30 volts per mil or greater without significant agglomeration. Particles appeared to be in the size range of 1-15 microns when observed through a microscope. Lower voltage gradients also produced good opening.

EXAMPLE 9

In order to demonstrate that other polar materials can also be used instead of acid in a copolymer formulation and still work, a 75%/25% by weight copolymer of 2-ethylhexyl acrylate/hydroxyethyl methacrylate was tested. The hydroxyethyl methacrylate monomer contains an OH functional group in each molecule. The hydroxyethyl methacrylate is also called ethylene glycol monomethacrylate. Using the method of Example 1, a successful well-protected suspension resulted. However, the 75%/25% composition of the copolymer prevented it from being completely soluble in isopentyl acetate alone, and hence it was necessary to use a 2:1 mixture of isopentyl acetate and chloroform as the suspending medium for test purposes. It was observed in the test cell that the electrical resistivity of the resulting suspension (approximately $1.5 \times 10^8$ ohm-cm) was an order of magnitude greater than in cases where acid groups were present in the copolymer used to protect the suspended crystals.

Many of the aforesaid tests were conducted more than once using copolymers of various viscositites i.e. molecular weights. In general, it is best to use the lowest molecular weight polymer possible consistent with anti-agglomeration objectives and other purposes, because higher molecular weight polymers increase viscosity of the suspension and reduce the rise and decay (response) times of light valve suspensions.

Alternatively, the molecular weight of the copolymer can be chosen, if known, so that the length of the extended copolymer chain would be at least 600 angstroms and preferably 2,000 to 4,200 angstroms or greater.

In order to avoid contamination of the final suspension, particularly in the case of a light valve suspension, the copolymer used should be as pure as possible. This is helpful in that it will prevent unnecessary conductivity in the final suspensions.

In the copolymer systems previously described, it has been established that the portion of the copolymer that was not of high polarity primarily affected the solubility of the copolymer.

In several of the aforesaid examples copolymers of 2-ethylhexyl acrylate/acrylic acid resulted in good protection for crystals of herapathite and other materials that were formed or comminuted therewith. As a result of these tests the conclusion was reached that probably the polar OH or acid functionality is responsible for the protection and that the non-polar groups in the copolymer serve the function of permitting the copolymer to be soluble in non-polar solvents or solvents of intermediate polarity depending upon chemical nature and quantities of the simple molecules contained in the copolymers. However, in order to be sure that the 2-ethylhexyl acrylate alone was not, by some chance, responsible for furnishing some or all of the protection, a homopolymer (not a copolymer) of 2-ethylhexyl acrylate was made, substituted for the copolymer in Example 1, and a paste of herapathite made in accordance with the method of Example 1. As expected, poly(2-ethylhexyl acrylate) did not prevent agglomeration of particles either during the reaction, during drying, or in a light valve suspension of the dried herapathite paste. Accordingly, the conclusion that the OH or acid functionality was responsible for the favorable results previously observed was confirmed.

In the case of a colloidal fluid suspension, whether being stored for future use or actually in an unactivated light valve (power off), a copolymer used therein can be said to adequately physically protect the suspended crystals if no significant noticeable agglomeration takes place over a long period of time - at least days and preferably years. As a quick test of the efficacy of a polymer, a colloidal fluid suspension with the polymer is placed in a light valve having a low viscosity suspending medium (approximately 5 centipoises or less) and the light valve activated by a 10 Kilohertz AC continuously applied electrical field (power on) having a continuous sinusoidal waveform and a voltage gradient strong enough to orient acicular crystals suspended therein, a copolymer used therein can be said to adequately physically protect the suspended crystals if the crystals do not noticeably agglomerate significantly for at least two seconds, and preferably for at least 20 seconds. If the field is applied in a pulsed mode using short pulses e.g., 20 milliseconds with relatively longer periods without an applied field between pulses, but with sufficient voltage gradient to orient suspended crystals, suspensions in which the particles are adequately physically protected should change optical density repeatedly (i.e., open and close) in response to such pulses for at least 5 cycles, and preferably for thousands of cycles or more without noticeably agglomerating significantly.

Significant particle agglomeration can be visually noticed as dot-like or clump-like areas in the suspension, as well as by a substantial change in closed and/or open optical density for the suspension.

Suspensions containing a copolymer that does not adequately physically protect the particles will agglomerate substantially and, in many cases, cease to function almost entirely in less than the lower time intervals cited above under the aforementioned test conditions. For an inadequately protected suspension, upon application of a voltage gradient that would cause the particles to orient without agglomerating if the copolymer was effective, the poorly protected suspension is generally observed to open but not to close. In this case, the "opening" i.e., reduction of optical density and increase of light transmission is in large part caused by immediate agglomeration of the crystals; the agglomerated crystals are thought to be loosely stuck together and therefore cannot disorient i.e, close through Brownian motion as quickly as discrete oriented particles can. Some poorly protected suspensions are so badly agglomerated before being placed in a light valve that the suspensions cannot be made to open at all.

It is thought that a copolymer that is effective in preventing or reducing agglomeration of particles in a suspension does so because part of the copolymer coils outward in solution in the suspending medium, possibly around the particles, thereby preventing or making difficult the close approach of another particle to the first particle.

In order that a material adequately physically protect suspended particles from agglomerating, two things are thought necessary, namely, that the material at least partially bond to or associate with the particles and, secondly, that the material by forming a thick enough barrier around the particles and/or extending part of itself into solution prevents the close approach and agglomeration of two particles. Any material that bonds to or associates with the particles and has a long average length in solution relative to the average diameter of the particles might meet these requirements, but polymers have been found most effective, and the branched copolymers of the present invention particularly efficacious and useful.

In order for a polymer to be useful in a light valve suspension as a stabilizer or for other purposes described herein, it is imperative that the polymer not coat the walls of the light valve and not coat the transparent electrically conductive coatings (i.e. the electrodes) that may cover all or part of the surfaces of the walls. If the polymer does coat the walls or electrodes they will become hazy in appearance and will limit the maximum light transmission. I have discovered that in order to prevent the polymer from forming such an unwanted coating one must select the monomers in the copolymer so that in a copolymer thereof, assuming all chains and branches fully extended and perpendicular to their source, functional bonding groups e.g. the OH and acidic groups will be closer, preferably much closer, to the polymer backbone than non-bonding groups on at least one monomer that includes no functional bonding groups therein. Thus, if 3,5,5-trimethyl hexyl acrylate is copolymerized in a random terpolymer with fumaric acid and 2-hydroxypropyl acrylate, it is apparent from the known structures of these monomers that the terminal groups of the first named monomer, which has no bonding groups therein, will extend further from the backbond that either the carboxyl groups in the fumaric acid monomer or the OH group in the 2-hydroxypropyl acrylate monomer. The same principle should be applied to polymers covered by this invention other than random copolymers e.g., for any part of a graft copolymer that has bonding groups therein even if such part is itself a polymer. Failure to follow the above-prescribed rule can lead to the undesirable result that the walls and electrodes become coated. It is theorized that this occurs because it becomes possible for the bonding groups to bond thereto. By following the aforesaid rule, the polymers can bond to the suspended particles but not bond to the cell walls and electrodes.

In addition to retarding agglomeration and permitting use of suspensions at relatively high temperatures, the polymers of the present invention are especially valuable in that they make it possible to use low activating voltages and small electric field gradients to operate light valve suspensions.

In the prior art relating to light valves, it has been suggested to use voltages at frequencies of 1 Kilohertz and higher. Use of lower frequencies would have resulted in the extremely rapid onset of agglomeration. This led to difficulty because low frequency power sources and outlets, such as 50 Hertz and 60 Hertz are commonly available throughout the industrialized world and use of low frequencies would eliminate the need for expensive high frequency power supplies, and would drastically reduce the amount of power required as well as the attendant cost of power.

The present invention enables low frequencies to be used without agglomeration or with only slight agglomeration.

A factor that determines whether a suspension agglomerates, and affects the rate of agglomeration if agglomeration does take place, is the voltage gradient applied across the suspension. Voltage gradient is here defined as the voltage across the suspension, divided by the thickness of the suspension; i.e., in an ohmic cell the voltage applied between the two electrodes in the cell, divided by the distance between the electrodes. An ohmic cell is one in which the electrodes are in direct contact with the suspension. For example, when a voltage of 600 volts is applied across an ohmic cell in which the thickness of the suspension is 20 mils, i.e. 0.020 inch, the voltage gradient is 30 volts per mil. When an alternating voltage is used, it should be specified whether the stated voltage is peak-to-peak, or whether the stated voltage is a room-mean-square, i.e. RMS, value for a sine wave alternating voltage. A capacitative cell is one in which the electrodes are not in contact with the suspension, i.e. a cell in which an insulating or capacitative layer is placed between the electrodes and the suspension.

Large voltage gradients are known to cause agglomeration and to accelerate agglomeration; whereas small voltage gradients eliminate or retard agglomeration. However, prior to this invention, small voltage gradients were not useful because they did not open the light valves sufficiently for any practical application. The present invention enables small voltage gradients to be useful because they open the light valves to appreciable values of light transmission without agglomeration or with only small amounts of agglomeration.

Further advantages of small voltage gradients are: reduced electric power required to operate the light valve, with consequent savings of energy and cost; low voltage wiring, thereby requiring less electrical insulation around the electrical leads and terminals associated with the light valve; smaller power supplies, and power supplies of less weight; use of compact, mass produced solid state electrical and electronic components; reduction of the electric current that passes through the suspension, with consequent reduction of the heat generated in the suspension. This last mentioned advantage accrues from the observation that heat generated in the cell tends to degrade and decompose the suspension, and can deteriorate the seals of the cell that contains the suspension within the light valve.

Another advantage of this invention is that it enables liquid suspension light valves to be used to construct sunglasses and variable optical density spectacles e.g., welding goggles. Prior to this invention, such applications of liquid suspension light valves were not practical because they required high voltages, e.g. hundreds of volts, and such voltages carried close to the eyes and head of the wearer constituted a personnel safety hazard. The present invention enables said sunglasses, spectacles and goggles to be worn safely because the voltages are low e.g. 4 volts.

Prior to this invention, a polymer was used to protect the suspended particles in the light valve, but such prior-art polymer had only relatively little effect in preventing agglomeration, and relatively high voltage gradients were required to open the light valve when the prior art polymer was used. Nitrocellulose is representative of the prior art.

The following further examples especially indicate the advantages of the polymers of this invention for the use of low voltages in light valves.

EXAMPLE 10A

Step 1: Dissolve the polymer in an alcohol such as n-propanol or methanol, or an ether alcohol such as 2-ethoxy-ethanol. Pour this solution into a high speed mixer, add 16.6 grams of tricresyl phosphate (TCP), and mix thoroughly. (Optionally, the TCP need not be added.)

Step 2: Add 7.3 grams of methyl alcohol to 3.7 grams of quinine bisulphate (QBS), and stir until the QBS is dissolved. Add this solution to the mixture made in Step 1, and mix thoroughly in the high speed mixer.

Step 3: Make a solution of 20 percent iodine crystals in n-propanol which should age about 20 days. Take 8 grams of this solution and add 4 grams of n-propanol in which 0.27 grams of calcium iodide has been dissolved. Shake until well mixed.

Step 4: The mixture of Step 3 is poured into the mixture of Step 2 while the latter mixture is in the mixer operating at high speed. The mixer remains at high speed for approximately 35 seconds, and is then stopped.

Step 5: The resulting mixture is spread on a glass plate to dry for approximately 90 minutes in an atmosphere of 78 degrees F. and 50 percent relative humidity.

Step 6: The paste that results from Step 5 is scraped from the glass plate with a sharp blade. This paste is then ground in an electric mortar grinder for approximately 30 minutes. 90 grams of isopentyl acetate (IPA) is then added to the mortar bowl. This mixture is then added to a jar containing 33 milliliters of chloroform ($CHCL_3$) and placed on a shaker for about one hour.

Step 7: The mixture resulting from Step 6 is diluted with IPA until it has an optical density of about 3 when placed in a light valve cell with a spacing of 33 mils, i.e. 0.033 inch.

Step 8: The suspension resulting from Step 7 is centrifuged for 4 to 7 hours at a speed of 2500 revolutions per minute at a radius of about 3.5 inches.

Step 9, The supernatant from Step 8 is discarded; IPA is added to the sediment; and the diluted sediment is treated in an ultrasonic generator at a frequency of 47 KHz for 1 to 2 hours.

Step 10: Centrifuge again for 2 to 3 hours.

Step 11: Repeat Step 9.

Step 12: Centrifuge again, for 20 to 30 minutes, and discard the supernatant.

Step 13: Dilute the sediment with IPA to give a suspension of the desired optical density.

The following are specific examples of the polymers of this invention, and the methods of making suspensions with these polymers.

EXAMPLE 10

Tetrapolymer: 3,5,5 trimethyl-1-hexyl acrylate/2-hydroxy propyl acrylate/di-2ethylhexyl maleate/fumaric acid, in the monomer percentages by weight 37.5/22/37.5/53.

A suspension was made in accordance with the method in the thirteen steps described above, with the following quantities used or exceptions. In Step 1, a solution of 2 grams of the tetrapolymer in 20 grams of alcohol was used. In Step 6, the mortar grinder is not used. After Step 7, and before Step 8, the diluted mixture is placed in an ultrasonic generator operating at about 47 KHz for about 17 hours.

Instead of Step 13, proceed as follows. Dilute the sediment with IPA and the tetrapolymer to give a suspension that contains 8 percent of the tetrapolymer. Thereafter dilute further with an 8 percent tetrapolymer solution in IPA, to give a suspension of the desired optical density.

EXAMPLE 11

Tetrapolymer: 3,5,5 trimethyl-1-hexyl acrylate/2-hydroxy propyl acrylate/vinylidine chloride/fumaric acid, in the monomer percentages by weight 75/10/15/3.

A suspension was made in accordance with the method of Example 10, with the following exceptions. In Step 1, the polymer of Example 11 was used instead of the polymer of Example 10.

EXAMPLE 12

Tetrapolymer: 3,5,5 trimethyl-1-hexyl acrylate/2-hydroxy propyl acrylate/di-2-ethylhexyl fumarate/fumaric acid, in the monomer percentages by weight 37.5/22/37.5/3.

A suspension was made as in Example 11, except that the polymer of Example 11 is replaced by the polymer of Example 12.

EXAMPLE 13

A suspension was prepared exactly as in the 13-step procedure above, using the homopolymer of the prior art, nitro-celluose (NC) instead of the copolymers of this invention.

In Step 1, 6.6 grams of HA 17 NC and 7.5 grams of 21.6 centipoise NC (E. I. du Pont de Nemours & Co.) were dissolved in 2-ethoxyethanol.

Suspensions made with the tetrapolymers in three of the preceding four examples, given above, do not agglomerate, or agglomerate very little compared to suspensions made with polymers of the prior art, when used in light valves. Furthermore, light valves made with the suspensions in the aforesaid three new polymer examples open much more, i.e transmit much more radiation, than suspensions of prior art, for the same voltage gradient.

Suspensions made with the new polymers in the three aforesaid examples were tested and compared with a suspension made with nitrocellulose (NC). The tests were as follows. An ohmic light-valve cell, that provided a 33 mil thickness for a suspension, was filled successively with a suspension made with NC and with suspensions of the three examples. Each time the cell was filled, it was activated successively by alternating voltages at frequencies of 40, 60, 100 and 1000 Hz. In addition, 500 Hz was used for the polymer of Example 12. At each of the aforesaid frequencies, voltages of 0, 100, 200, 300, 400, 500 and 600 volts peak-to-peak were applied successively. At each and every combination of the aforesaid frequencies and voltages, the optical transmission of the cell was measured in the visible portion of the spectrum, with an RCA photomultiplier No. 931-A manufactured by Radio Corporation of America. The results are given in the following tables. The headings "NC" in the tables means the transmissions of suspension made with NC. The headings "new polymer" means the transmissions of the suspensions made with the polymers of the present invention in accordance with each respective example. The ratio of the transmission in each case is the quotient of the transmission of the suspension made with a new polymer divided by the transmission of the suspension made with NC.

| USING COPOLYMER OF EXAMPLE 10 FREQUENCY: 40 Hz | | | | |
|---|---|---|---|---|
| Applied Voltage Peak-to-Peak | Voltage Gradient Volts Per Mil | Transmission In Percent NC | New Polymer | Ratio of Transmissions |
| 0 | 0 | .977 | .955 | .977 |
| 100 | 3.03 | 1.02 | 1.32 | 1.29 |
| 200 | 6.06 | 1.26 | 3.47 | 2.75 |
| 300 | 9.09 | 1.74 | 6.61 | 3.79 |
| 400 | 12.12 | 2.51 | 10.23 | 4.07 |
| 500 | 15.15 | 3.98 | 12.59 | 3.16 |
| 600 | 18.18 | 6.17 | 14.13 | 2.29 |

| USING COPOLYMER OF EXAMPLE 10 FREQUENCY: 60 Hz | | | | |
|---|---|---|---|---|
| Applied Voltage Peak-to-Peak | Voltage Gradient Volts Per Mil | Transmission In Percent NC | New Polymer | Ratio of Transmissions |
| 0 | 0 | .977 | .955 | .977 |
| 100 | 3.03 | 1.02 | 1.32 | 1.29 |
| 200 | 6.06 | 1.35 | 3.31 | 2.45 |
| 300 | 9.09 | 2.00 | 6.61 | 3.30 |
| 400 | 12.12 | 2.95 | 10.47 | 3.54 |
| 500 | 15.15 | 4.47 | 12.88 | 2.75 |
| 600 | 18.18 | 6.46 | 14.79 | 2.28 |

| USING COPOLYMER OF EXAMPLE 10 FREQUENCY: 100 Hz | | | | |
|---|---|---|---|---|
| Applied Voltage Peak-to-Peak | Voltage Gradient Volts Per Mil | Transmission In Percent NC | New Polymer | Ratio of Transmissions |
| 0 | 0 | .977 | .955 | .977 |
| 100 | 3.03 | 1.05 | 1.32 | 1.25 |
| 200 | 6.06 | 1.41 | 3.39 | 2.40 |
| 300 | 9.09 | 2.00 | 6.61 | 3.30 |
| 400 | 12.12 | 3.16 | 10.00 | 3.16 |
| 500 | 15.15 | 4.90 | 12.88 | 2.62 |
| 600 | 18.18 | 7.08 | 15.14 | 2.13 |

| USING COPOLYMER OF EXAMPLE 10 FREQUENCY: 1,000 Hz | | | | |
|---|---|---|---|---|
| Applied Voltage Peak-to-Peak | Voltage Gradient Volts Per Mil | Transmission In Percent NC | New Polymer | Ratio of Transmissions |
| 0 | 0 | .955 | .955 | .977 |
| 100 | 3.03 | 1.26 | 1.45 | 1.15 |
| 200 | 6.06 | 2.51 | 3.63 | 1.44 |
| 300 | 9.09 | 5.01 | 7.59 | 1.51 |
| 400 | 12.12 | 8.51 | 11.22 | 1.31 |
| 500 | 15.15 | 12.59 | 13.49 | 1.07 |
| 600 | 18.18 | 15.85 | 15.95 | 1.01 |

| USING COPOLYMER OF EXAMPLE 11 FREQUENCY: 40 Hz | | | | |
|---|---|---|---|---|
| Applied Voltage Peak-to-Peak | Voltage Gradient Volts Per Mil | Transmission In Percent NC | New Polymer | Ratio of Transmissions |
| 0 | 0 | .977 | 1.18 | 1.20 |
| 100 | 3.03 | 1.02 | 2.34 | 2.30 |
| 200 | 6.06 | 1.26 | 6.31 | 5.00 |
| 300 | 9.09 | 1.74 | 9.77 | 5.81 |

-continued

USING COPOLYMER OF EXAMPLE 11
FREQUENCY: 40 Hz

| Applied Voltage Peak-to-Peak | Voltage Gradient Volts Per Mil | Transmission In Percent NC | Transmission In Percent New Polymer | Ratio of Transmissions |
|---|---|---|---|---|
| 400 | 12.12 | 2.51 | 12.59 | 5.01 |
| 500 | 15.15 | 3.98 | 14.79 | 3.96 |
| 600 | 18.18 | 6.17 | 15.85 | 2.56 |

USING COPOLYMER OF EXAMPLE 11
FREQUENCY: 60 Hz

| Applied Voltage Peak-to-Peak | Voltage Gradient Volts Per Mil | Transmission In Percent NC | Transmission In Percent New Polymer | Ratio of Transmissions |
|---|---|---|---|---|
| 0 | 0 | .977 | 1.18 | 1.20 |
| 100 | 3.03 | 1.02 | 2.24 | 2.19 |
| 200 | 6.06 | 1.35 | 6.31 | 4.67 |
| 300 | 9.09 | 2.00 | 10.00 | 5.00 |
| 400 | 12.12 | 2.95 | 13.18 | 4.46 |
| 500 | 15.15 | 4.47 | 15.85 | 3.54 |
| 600 | 18.18 | 6.46 | 17.78 | 2.75 |

USING COPOLYMER OF EXAMPLE 11
FREQUENCY: 100 Hz

| Applied Voltage Peak-to-Peak | Voltage Gradient Volts Per Mil | Transmission In Percent NC | Transmission In Percent New Polymer | Ratio of Transmissions |
|---|---|---|---|---|
| 0 | 0 | .977 | 1.18 | 1.20 |
| 100 | 3.03 | 1.05 | 2.34 | 2.22 |
| 200 | 6.06 | 1.41 | 6.31 | 4.47 |
| 300 | 9.09 | 2.00 | 9.55 | 4.77 |
| 400 | 12.12 | 3.16 | 12.88 | 4.07 |
| 500 | 15.15 | 4.90 | 15.85 | 3.23 |
| 600 | 18.18 | 7.08 | 18.62 | 2.62 |

USING COPOLYMER OF EXAMPLE 11
FREQUENCY: 1,000 Hz

| Applied Voltage Peak-to-Peak | Voltage Gradient Volts Per Mil | Transmission In Percent NC | Transmission In Percent New Polymer | Ratio of Transmissions |
|---|---|---|---|---|
| 0 | 0 | .977 | 1.18 | 1.20 |
| 100 | 3.03 | 1.26 | 2.51 | 1.99 |
| 200 | 6.06 | 2.50 | 6.31 | 2.51 |
| 300 | 9.09 | 5.01 | 10.47 | 2.08 |
| 400 | 12.12 | 8.51 | 14.13 | 1.66 |
| 500 | 15.15 | 12.59 | 16.60 | 1.31 |
| 600 | 18.18 | 15.85 | 19.05 | 1.20 |

USING COPOLYMER OF EXAMPLE 12
FREQUENCY: 40 Hz

| Applied Voltage Peak-to-Peak | Voltage Gradient Volts Per Mil | Transmission In Percent NC | Transmission In Percent New Polymer | Ratio of Transmissions |
|---|---|---|---|---|
| 0 | 0 | .977 | 1.02 | 1.04 |
| 100 | 3.03 | 1.02 | 1.86 | 1.82 |
| 200 | 6.06 | 1.26 | 5.01 | 3.97 |
| 300 | 9.09 | 1.74 | 9.77 | 5.61 |
| 400 | 12.12 | 2.51 | 13.18 | 5.25 |
| 500 | 15.15 | 3.98 | 15.85 | 3.98 |
| 600 | 18.18 | 6.17 | 18.20 | 2.94 |

USING COPOLYMER OF EXAMPLE 12
FREQUENCY: 60 Hz

| Applied Voltage Peak-to-Peak | Voltage Gradient Volts Per Mil | Transmission In Percent NC | Transmission In Percent New Polymer | Ratio of Transmissions |
|---|---|---|---|---|
| 0 | 0 | .977 | 1.02 | 1.04 |
| 100 | 3.03 | 1.02 | 1.876 | 1.82 |
| 200 | 6.06 | 1.35 | 4.68 | 3.46 |
| 300 | 9.09 | 2.00 | 11.22 | 5.61 |
| 400 | 12.12 | 2.95 | 15.49 | 5.25 |
| 500 | 15.15 | 4.47 | 18.62 | 4.16 |
| 600 | 18.18 | 6.46 | 19.50 | 3.01 |

USING COPOLYMER OF EXAMPLE 12
FREQUENCY: 100 Hz

| Applied Voltage Peak-to-Peak | Voltage Gradient Volts Per Mil | Transmission In Percent NC | Transmission In Percent New Polymer | Ratio of Transmissions |
|---|---|---|---|---|
| 0 | 0 | .977 | 1.02 | 1.04 |
| 100 | 3.03 | 1.05 | 1.95 | 1.85 |
| 200 | 6.06 | 1.41 | 4.79 | 3.39 |
| 300 | 9.09 | 2.00 | 11.22 | 5.61 |
| 400 | 12.12 | 3.16 | 15.49 | 4.88 |
| 500 | 15.15 | 4.90 | 18.62 | 3.80 |
| 600 | 18.18 | 7.08 | 19.95 | 2.81 |

USING COPOLYMER OF EXAMPLE 12
FREQUENCY: 500 Hz

| Applied Voltage Peak-to-Peak | Voltage Gradient Volts Per Mil | Transmission In Percent NC | Transmission In Percent New Polymer | Ratio of Transmissions |
|---|---|---|---|---|
| 0 | 0 | .977 | 1.02 | 1.04 |
| 100 | 3.03 | 1.18 | 2.04 | 1.72 |
| 200 | 6.06 | 1.95 | 5.50 | 2.82 |
| 300 | 9.09 | 3.55 | 10.96 | 3.08 |
| 400 | 12.12 | 6.03 | 15.14 | 2.51 |
| 500 | 15.15 | 8.91 | 17.78 | 1.99 |
| 600 | 18.18 | 12.02 | 19.05 | 1.58 |

USING COPOLYMER OF EXAMPLE 12
FREQUENCY: 1,000 Hz

| Applied Voltage Peak-to-Peak | Voltage Gradient Volts Per Mil | Transmission In Percent NC | Transmission In Percent New Polymer | Ratio of Transmissions |
|---|---|---|---|---|
| 0 | 0 | .977 | 1.02 | 1.04 |
| 100 | 3.03 | 1.26 | 1.95 | 1.54 |
| 200 | 6.06 | 2.51 | 5.75 | 2.29 |
| 300 | 9.09 | 5.01 | 11.22 | 2.23 |
| 400 | 12.12 | 8.51 | 15.85 | 1.86 |
| 500 | 15.15 | 12.59 | 19.05 | 1.51 |
| 600 | 18.18 | 15.85 | 20.42 | 1.28 |

Examination of this data reveals the following.

The use of the polymers of this invention results in more than a five-fold increase in the opening of the light valve compared to the use of prior-art polymers. This is shown for the copolymer of Example 11 at 300 volts and 40 Hz. It is shown also for the copolymer of Example 12 at 300 volts at 40, 60 and 100 Hz.

At all frequencies of the activating voltage, and at all voltages, the polymers of this invention give greater value openings i.e. more transmission, than does the polymer of the prior art, i.e. NC. This is shown without exception in all rows of figures in all examples at all frequencies in all of the tables of measurements given above. In all cases, the use of the polymers of this invention enables the light valve to be opened more with a lower activating voltage.

The present invention can be used with light valves that are used as displays, windows including double glazed units, windshields, mirrors and many similar devices.

The previously described liquid suspensions can also be set (hardened) by not adding any plasticizer in their preparation. The uses of such set suspensions include using these thin, hardened films of material as sheet polarizers.

The polymers of this invention are useful with a variety of kinds of particles including dye particles, dichroic, pleochroic or light polarizing dye materials.

It is understood that this invention may be used for a light valve that operates in part or all of the infrared and/or ultraviolet portions of the electromagnetic spectrum as well as the visible part of electromagnetic spectrum depending on the type of light valve and suspension employed.

It is understood that the term "liquid", where applicable, may include a gel or a thixotropic liquid, or a plastic liquid provided that the suspended particles can be oriented therein upon application of an electric field.

Although the polymers of this invention have been discussed herein primarily in terms of their use in a light valve suspension, it should be understood that they may be employed in any other type of suspension where any of their properties may be favorably utilized e.g., as binders, in coatings for special papers, and in paints and ink formulations.

While specific embodiments of my invention have been illustrated, it will be appreciated that the invention is not limited thereto, since many modifications may be made by one skilled in the art which fall within the true spirit and scope of the invention.

I claim:

1. A light valve for controlling the transmission of radiation, which comprises a cell and a liquid suspension in said cell; said liquid suspension comprising:
   an electrically resistive liquid suspending medium;
   a plurality of small, anisometrically shaped, light-polarizing, halogen-containing particles suspended in said suspending medium; and
   a copolymer of at least two different monomers;
   at least one of said monomers having a sterically unhindered functional group selected from the group consisting of an OH group and an acidic group, and at least one of said monomers having a branched group, the distance from the backbone of the copolymer to said sterically unhindered functional group most distant from the backbone being less than the distance from the backbone to the terminal group of said branched group, the branched groups in said copolymer being sufficiently soluble so that the copolymer as a whole is substantially dissolved in said liquid suspending medium.

2. The light valve of claim 1 wherein said branched group has a plurality of branches.

3. The light valve of claim 1, wherein said monomer containing said branched group contains none of said functional groups.

4. The light valve of claim 1, wherein said monomer containing said branched group constitutes more than 50%, by weight, of the copolymer.

5. The light valve of claim 1, wherein said monomer containing said branched group has a higher molecular weight than the other monomers.

6. The light valve of claim 1 wherein the particles are polyhalide particles.

7. The light valve of claim 6 wherein the polyhalide particles are polybromide particles of colloidal size.

8. The light valve of claim 7 wherein the monomer containing said functional group is a hydroxyalkyl ester.

9. The light valve of claim 8 wherein the hydroxyalkyl ester is a hydroxyalkyl acrylate.

10. The light valve of claim 7 wherein the monomer containing said functional group is a polybasic acid.

11. The light valve of claim 10 wherein the polybasic acid is selected from the group consisting of fumaric acid, maleic acid, and mesaconic acid.

12. The light valve of claim 7 wherein the monomer containing said branched group is an ether.

13. The light valve of claim 7 wherein the copolymer includes a monomer which is selected from the group consisting of a partially esterified polybasic acid and a completely esterified polybasic acid.

14. The light valve of claim 7 wherein the monomer containing said branched group is a halogenated monomer.

15. The light valve of claim 7 wherein the copolymer is selected from the group consisting of random, alternating, block, and graft copolymers.

16. The light valve of claim 1 wherein the suspending medium is non-aqueous.

17. The light valve of claim 16 wherein the suspending medium is a non-polar ether.

18. The light valve of claim 16 wherein the suspending medium is a halogenated liquid.

19. The light valve of claim 18 wherein the halogenated liquid is selected from the group consisting of fluorinated alkanes, fluorinated esters and fluorinated ethers.

20. The light valve of claim 19, wherein said monomer containing said branched group is a fluorinated monomer.

21. The light valve of claim 1 wherein the copolymer permits the suspension to achieve temperature stability above 100° F. without significant degradation.

22. The light valve of claim 1 wherein the suspension is stabilized so that an applied voltage of at most 15 volts peak-to-peak per mil of suspension thickness at an AC frequency of 1000 Hertz or less will cause a substantial change in the light transmission of said suspension.

23. The light valve of claim 1 wherein the suspension has a light transmission for visible light of at most one percent, and has a light transmission of at least ten times that amount upon the application of at most 12 volts peak-to-peak per mil of suspension thickness at an AC frequency of 1000 Hertz or less.

24. The light valve of claim 1 wherein the particles comprise a material selected from the group consisting of herapathite, cupric bromide, and purpureocobalt-chloridesulfateperiodide.

25. The light valve of claim 1 wherein the copolymer is a copolymer of monomers selected from the group consisting of 2-ethylhexyl acrylate/acrylic acid; 2-ethylhexyl acrylate/hydroxyethyl methacrylate; ethyl acrylate/hydroxyethyl methacrylate; 2-ethylhexyl acrylate/2-hydroxypropylacrylate/acrylic acid; 2-ethylhexyl acrylate/2-hydroxypropyl acrylate/fumaric acid; 2-ethylhexyl acrylate/2-hydroxypropyl acrylate/-vinylidene chloride/fumaric acid; 3,5,5-trimethyl hexyl acrylate/2-hydroxypropyl methacrylate; 3,5,5-trimethyl hexyl acrylate/2-hydroxypropyl acrylate/fumaric acid; 3,5,5-trimethyl hexyl acrylate/2-hydroxypropyl acrylate/di-2-ethylhexyl maleate/fumaric acid; 3,5,5-trimethyl hexyl acrylate/2-hydroxypropyl acrylate/di-2-ethylhexyl fumarate/fumaric acid; 2,5,5-trimethyl hexyl acrylate/2-hydroxypropyl acrylate/vinylidene chloride/fumaric acid; 5,5-diethyl hexyl acrylate/2-hydroxypropyl acrylate/fumaric acid; bis-2-ethylhexyl fumarate/2-hydroxypropyl acrylate/acrylonitrile; and bis-2-ethylhexyl fumarate/3,5,5-trimethyl hexyl acrylate/vinylidene chloride/mesaconic acid.

* * * * *